F. KRITZ.
TUBE WELDING MECHANISM.
APPLICATION FILED OCT. 3, 1916.
1,273,502.
Patented July 23, 1918.
3 SHEETS—SHEET 1.
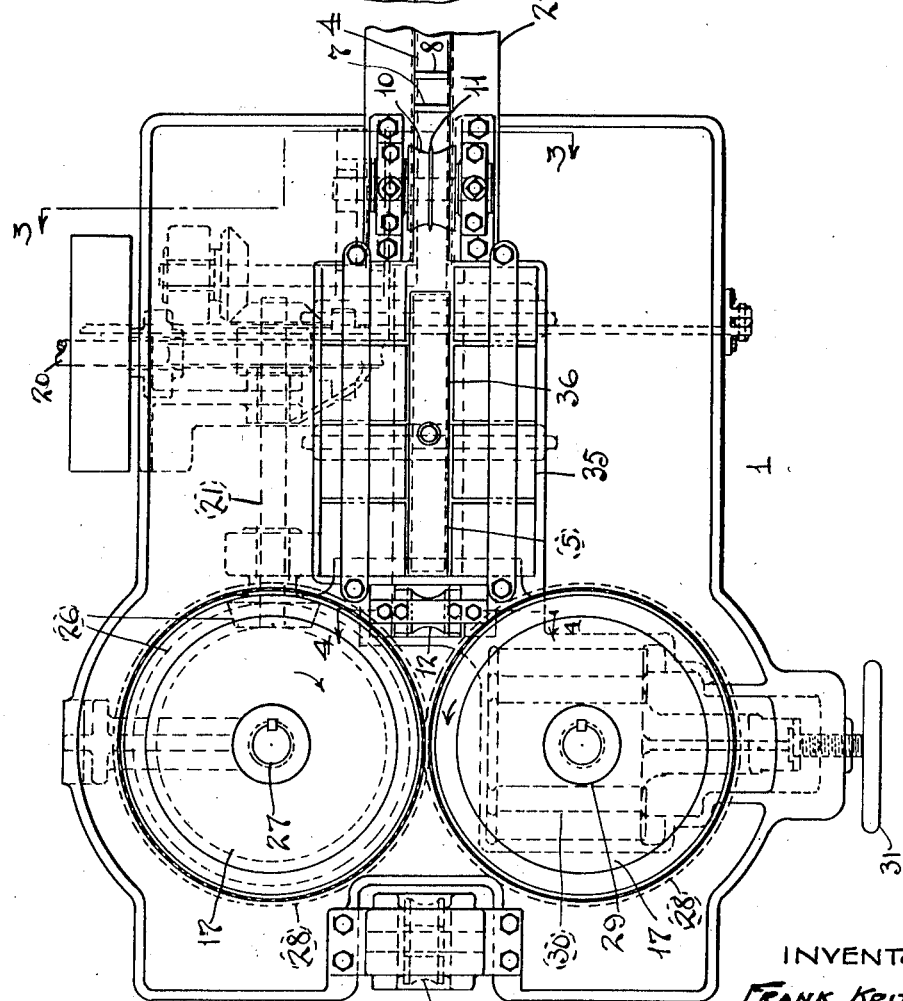
INVENTOR
FRANK KRITZ.
BY
Jay, Oberlin & Jay
ATTORNEYS
WITNESSES:
O. M. Kappler
Mary Gladwell

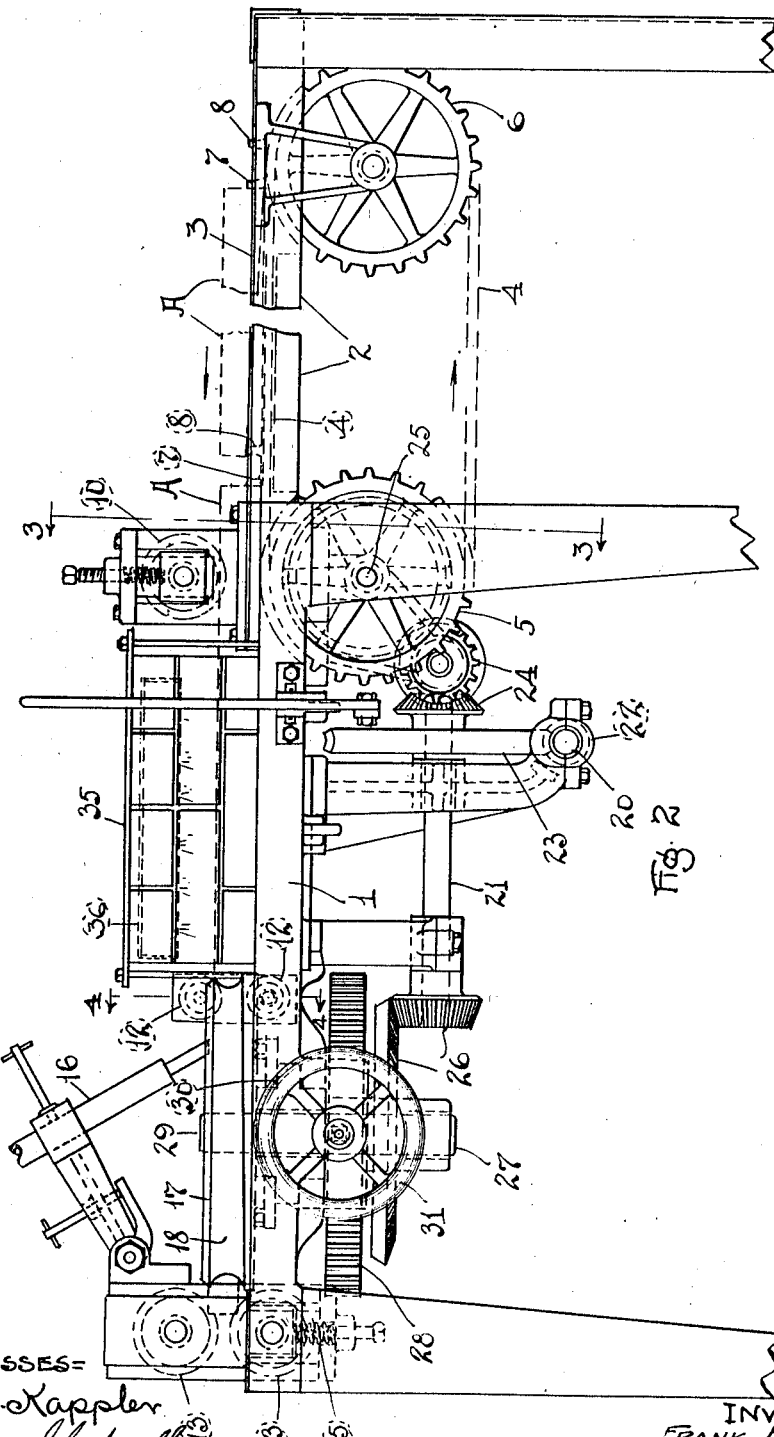

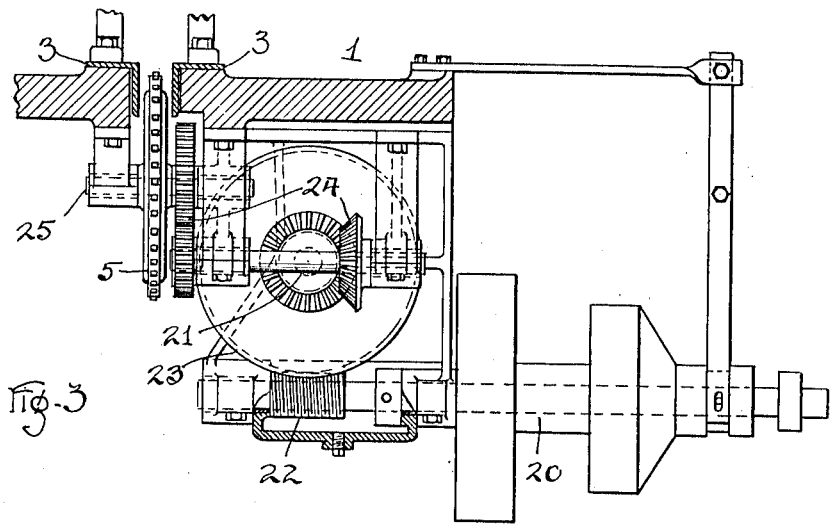
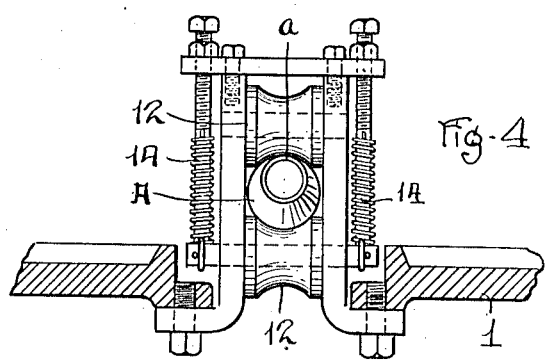
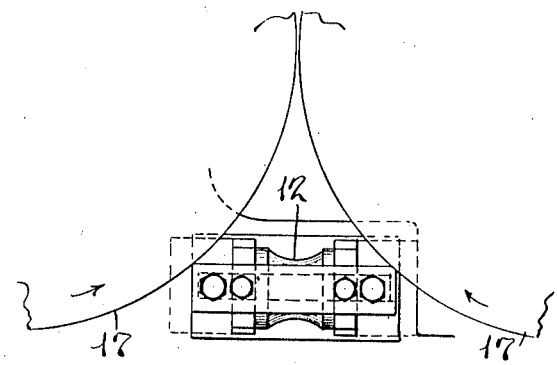

UNITED STATES PATENT OFFICE.

FRANK KRITZ, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

TUBE-WELDING MECHANISM.

1,273,502.  Specification of Letters Patent.  Patented July 23, 1918.

Application filed October 3, 1916. Serial No. 123,514.

*To all whom it may concern:*

Be it known that I, FRANK KRITZ, a citizen of the United States, and a resident of Cleveland, county of Cuyahoga, and State of Ohio, have invented a new and useful Improvement in Tube-Welding Mechanism, of which the following is a specification, the principle of the invention being herein explained and the best mode in which I have contemplated applying that principle, so as to distinguish it from other inventions.

More or less difficulty has heretofore been encountered in welding tubes of varying diameter or cross-sectional form. In particular there is a large demand for tubes which taper from one end to the other for use as so-called drive shafts or torsion tubes for automobiles of a certain design, but, so far as I aware, the only way heretofore proposed for making such tubes has involved the use of paired clamp members in combination with endless chains provided with vise jaws adapted to press such members together and convey them past the welding station with the tube clamped therebetween. The object of the present invention is the provision of a much simpler machine for welding tubing of this sort, and one that, at the same time, will operate expeditiously and economically and with the assurance of a satisfactory seam being produced. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is a plan view of a machine embodying my present improvements; Fig. 2 is a side elevational view of the same; Fig. 3 is a transverse cross-section taken on the plane indicated by the line 3—3, Fig. 1; Fig. 4 is another transverse cross-section taken on the plane indicated by the line 4—4, Fig. 1; and Fig. 5 is a diagrammatic plan view of the rolls between which the tube is held during the welding operation proper.

The present machine, it will be understood, is designed to operate on preliminarily formed tubing, that is on sections A of tubing of prescribed length (as indicated in dotted outline in Fig. 2), which have been preliminarily fashioned by other means, so as to have their edges *a* in substantially abutting relation, as indicated in full lines in Fig. 4. The present machine, furthermore, is designed to utilize an oxy-acetylene flame as the specific heating agency for fusing such abutting edges and thus welding the seam, but it will be understood that other types of gaseous burners or electrical heating means may be utilized, without affecting the operation of the machine in the other respects which are of principal interest in the present connection.

In addition to the main frame 1 of the machine which supports the welding mechanism proper, as will be presently described, an extension 2 forming a table or rest for the preliminarily formed sections of tubing is provided. This table consists in effect merely of two angle bars 3 (see Fig. 3), spaced a slight distance apart with their depending flanges on their inner edges so as to provide a guide for the upper lap of an endless chain 4 that passes around sprockets 5 and 6, one located at each end of the table 2, as clearly shown in Fig. 2. This chain carries a plurality of pairs of projections or studs 7 and 8, one of which is adapted to engage or contact with the larger end of a section of tubing and move the same longitudinally of the table from right to left as viewed in Figs. 1 and 2, while the other is adapted to support the smaller end of the section so as to maintain the upper edge thereof practically horizontal.

In line with the direction of movement of the tubing, as thus effected, a series of rolls are mounted in the machine frame proper, the first of these consisting of a single roll 10 having a central peripheral raised portion in the form of a knife edge 11, that is adapted to engage the slit between the edges of the tube and so serve to guide the latter through the welding mechanism with such seam in proper relation to the welding torch.

In addition to the roll 10 just described, two pairs 12, 12 and 13, 13 of plain grooved guide rollers are provided, one pair closely adjacent to the welding station and the other some distance beyond. The paired rolls in each case are resiliently supported in their housings, as indicated in Figs. 2 and 4, by means of springs 14 and 15 respectively, which permit the lower roll in each pair to rise and fall, or vice versa, as the tapered tube is fed through between them, and yet at all times maintain a firm grip on such tube, so as to guide the same accurately through the welding mechanism.

The latter comprises, in addition to the welding device proper, which takes the form of an oxy-acetylene torch 16 oscillatorily supported from the one end of the machine frame, so as to bring its tip directly over the seam of the tube, as the latter is fed through the machine, a pair of similar rolls or disks 17 having grooved peripheries, the circumference of such rolls being equal to or greater than the length of the tube-section to be welded, and the grooves 18 in their peripheries being of circular cross-section, but of varying depth and curvature, so as to correspond with the varying diameter of such tube.

The direction of rotation of these rolls, as indicated by the arrows on Figs. 1 and 5, is of course such as to assist in drawing the tube through between the same and between the successive guide rolls 12, 12 and 13, 13 previously described, the small end of the tube being started between said rolls just as the smallest portions of the grooves in their peripheries are brought into juxtaposition. Accordingly, as the rolls rotate, drawing the tube through in the fashion described, the latter is at all times firmly clamped by the grooves, which increase in diameter proportionately to the increase in diameter of the tube.

As clearly shown in Fig. 2, the grooves formed in the rolls or disks 17 lie with their upper edge in a horizontal plane, that is alined or parallel with the direction of movement of the tube. Accordingly, the seam which lies on the upper side of the tube, being accurately guided by the roller 10, as previously explained, will move in a strictly horizontal line directly beneath the welding device 16, and so have its edges uniformly fused and produce a perfect weld throughout the length of the tube.

Suitable driving means are provided for conjointly operating the rolls 17 just described, as well as the conveying or feeding device consisting of the chain 4 passing around the sprocket wheels 5. As illustrated, such driving means comprise a drive shaft 20 disposed transversely of the machine frame and a second shaft 21 extending longitudinally of the latter, a worm 22 and gear 23 connecting said two shafts. The last-named shaft 21 is then connected by suitable gearing 24 at one end with a shaft 25 that carries the sprocket 5, and at its other end by means of other gearing 26, with the spindle 27 that carries one of the grooved rolls 17. Spur gears 28 connect this spindle with that (29) of the other roll 17, so as to cause the same to rotate in opposite directions, as will be readily understood. Such last named spindle 29, moreover, is carried on a slide 30 movable transversely of the line of travel of the tubing by means of a hand wheel 31, so as to vary the degree of closeness with which the inner edges of the rolls approach each other.

Between the first guide roller 10 and the pair of guide rollers 12, 12, is preferably interposed a brick-incased oven or pre-heating chamber 35, which is kept at a fairly high temperature by means of a gas-burner 36, or other equivalent heating means, so that, as a tube passes therethrough on its way to the welding station, it will be raised considerably above the outside temperature and thus render the welding of the seam correspondingly easy. The burner 36, it will be observed, is located in the upper portion of this chamber, so as to direct the heat therefrom onto the seam in the first instance.

Having thus described the construction of my improved machine, the manner of its operation should be readily apparent. Sections A of preliminarily formed tubing are placed on the conveyer chain 4, which feeds such sections into the welding mechanism proper, these sections being laid on the chain with their seams uppermost, and being supported by means of the lugs 7 and 8, with such seam in approximately horizontal position, all as heretofore fully explained. The correct angular position of the seam is insured by the engagement therewith of the rib 11 in the first guide roller 10, so that, when the advance end of the tube finally reaches the grooved horizontal rollers 17, 17 and is gripped therebetween, such seam will be drawn directly beneath the tip of the torch 16. The seam, and the tube as a whole for that matter, has in the meantime been preliminarily heated in the chamber 35, and the welding of the seam thus facilitated, as previously explained.

As soon as one tube has been passed through between the rolls and expelled from the machine in completed condition, the small end of the next succeeding tube is presented and the proper portions of the grooves 18 in such rolls 17 are again brought into juxtaposition to receive such end, so that the operation is a continuous one as long as tubes continue to be placed on the feeding table. It will be observed that, with a machine of the character just described, it is unnecessary to provide movable vise jaws between which to clamp the tube while it is being welded, but the tubes are fed in succession through the machine just as though they constituted one piece of tubing of indefinite length, the operation of the machine being equally automatic and uninterrupted.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism for welding longitudinal seams on tubes or like articles of varying diameter, the combination with a suitable welding device; of means for feeding the article past said device, said means including a pair of complementary, peripherally grooved rollers, the grooves in the latter being of varying cross-sectional form to correspond with the varying diameter of the article.

2. In mechanism for welding longitudinal seams on tubes or like articles of varying diameter, the combination with a suitable welding device; of means for feeding the article past said device, said means including a pair of complementary, peripherally grooved rollers, the grooves in the latter being of varying cross-sectional form to correspond with the varying diameter of the article, and having corresponding edges disposed in the same plane.

3. In mechanism for welding longitudinal seams on tubes or like articles of varying diameter, the combination with a suitable welding device; of means for feeding the article past said device, said means including a pair of complementary, peripherally grooved rollers, the grooves in the latter being of varying cross-sectional form to correspond with the varying diameter of the article; and a guide roller alined with the direction of movement of such article through said feed rollers, said guide roller being resiliently mounted to accommodate the varying diameter of the article.

4. In mechanism for welding longitudinal seams on tubes or like articles of varying diameter, the combination with a suitable welding device; of means for feeding the article past said device, said means including a pair of complementary, peripherally grooved rollers, the grooves in the latter being of varying cross-sectional form to correspond with the varying diameter of the article, and having corresponding edges disposed in the same plane; and a guide roller alined with the direction of movement of such article through said feed rollers, said guide roller being resiliently mounted to accommodate the varying diameter of the article.

5. In mechanism for welding longitudinal seams on tubes or like articles of varying diameter, the combination with a suitable welding device; of means for feeding the article past said device, said means including a pair of complementary, peripherally grooved rollers, the grooves in the latter being of varying cross-sectional form to correspond with the varying diameter of the article, and having corresponding edges disposed in the same plane; and a pair of guide rollers disposed one above the other in line with the direction of movement of such article through the aforesaid rollers, the lower of said rollers being resiliently mounted to accommodate the varying diameter of the article.

6. In mechanism for welding longitudinal seams on tubes or like articles of varying diameter, the combination with a suitable welding device; of means for conveying the article with its seam parallel to the direction of travel; and other means adapted to receive such article from said conveying means and feed the same past said device, said feeding means including a pair of complementary, peripherally grooved rollers, the grooves in the latter being of varying cross-sectional form to correspond with the varying diameter of the article and having their upper edges disposed in a plane parallel with the seam of such article.

7. In mechanism for welding longitudinal seams on tubes or like articles of varying diameter, the combination with a suitable welding device; of means for conveying the article with its seam parallel to the direction of travel; other means adapted to receive such article from said conveying means and feed the same past said device, said feeding means including a pair of complementary, peripherally grooved rollers, the grooves in the latter being of varying cross-sectional form to correspond with the varying diameter of the article and having their upper edges disposed in a plane parallel with the seam of such article; and a guide roller alined with the direction of movement of such article through said feed rollers, said guide roller being resiliently mounted to accommodate the varying diameter of the article.

8. In mechanism for welding longitudinal seams on tubes or like articles of varying diameter, the combination with a suitable welding device; of means for conveying the article with its seam parallel to the direction of travel; other means adapted to receive such article from said conveying means and feed the same past said device, said feeding means including a pair of complementary, peripherally grooved rollers, the grooves in the latter being of varying cross-sectional form to correspond with the varying diameter of the article and having their upper edges disposed in a plane parallel with the seam of such article; and a pair of guide rollers disposed one above the other in line with the direction of movement of such article through said feed rollers, the lower of said guide rollers being resiliently mounted to accommodate the varying diameter of the article.

9. In mechanism for welding longitudinal seams on tubes or like articles of varying diameter, the combination with a suitable welding device; of means for conveying the article with its seam parallel to the direction of travel; other means adapted to receive such article from said conveying means and feed the same past said device, said feeding means including a pair of complementary, peripherally grooved rollers, the grooves in the latter being of varying cross-sectional form to correspond with the varying diameter of the article and having their upper edges disposed in a plane parallel with the seam of such article; a pair of guide rollers disposed one above the other in line with the direction of movement of such article through said feed rollers, the lower of said guide rollers being resiliently mounted to accommodate the varying diameter of the article; and another roller formed to engage the seam in such article and so position the latter angularly about its axis.

10. In mechanism for welding longitudinal seams on tapered tubes or like articles of similarly varying diameter, the combination with a suitable welding device; of means for feeding the article past said device, said means including a pair of complementary, peripherally grooved rollers, the grooves in the latter being of circular cross-section, but constantly increasing in diameter from the point where the article is initially gripped to the point where it is discharged.

11. In mechanism for welding longitudinal seams on tapered tubes or like articles of similarly varying diameter, the combination with a suitable welding device; of means for feeding the article past said device, said means including a pair of complementary, peripherally grooved rollers, the grooves in the latter being of circular cross-section, but constantly increasing in diameter from the point where the article is initially gripped to the point where it is discharged, and said grooves having corresponding edges disposed in the same plane.

12. In mechanism for welding longitudinal seams on tapered tubes or like articles of similarly varying diameter, the combination with a suitable welding device; of means for feeding the article past said device, said means including a pair of complementary, peripherally grooved rollers, the grooves in the latter being of circular cross-section, but constantly increasing in diameter from the point where the article is initially gripped to the point where it is discharged; and a guide roller alined with the direction of movement of such article through said feed rollers, said guide roller being resiliently mounted to accommodate the varying diameter of the article.

13. In mechanism for welding longitudinal seams on tapered tubes or like articles of similarly varying diameter, the combination with a suitable welding device; of means for feeding the article past said device, said means including a pair of complementary, peripherally grooved rollers, the grooves in the latter being of circular cross-section, but constantly increasing in diameter from the point where the article is initially gripped to the point where it is discharged, and said grooves having corresponding edges disposed in the same plane; and a pair of guide rollers disposed one above the other in line with the direction of movement of such article through the aforesaid rollers, the lower of said guide rollers being resiliently mounted to accommodate the varying diameter of the article.

14. In mechanism for welding longitudinal seams on tapered tubes or like articles of similarly varying diameter, the combination with a suitable welding device; of means for feeding the article past said device, said means including a pair of complementary, peripherally grooved rollers, the grooves in the latter being of circular cross-section, but constantly increasing in diameter from the point where the article is initially gripped to the point where it is discharged, and said grooves having corresponding edges disposed in the same plane; a pair of guide rollers disposed one above the other in line with the direction of movement of such article through the aforesaid rollers, the lower of said guide rollers being resiliently mounted to accommodate the varying diameter of the article; and another roller formed to engage the seam in such article and so position the latter angularly about its axis.

15. In mechanism for welding longitudinal seams on tapered tubes or like articles of similarly varying diameter, the combination with a suitable welding device; of an endless chain for conveying the article, said chain being arranged and constructed to support such article with its seam parallel to the direction of travel; and means for feeding the article past said device, said means including a pair of complementary, peripherally grooved rollers, the grooves in the latter being of circular cross-section, but constantly increasing in diameter from the point where the article is initially gripped to the point where it is discharged.

16. In mechanism for welding longitudinal seams on tapered tubes or like articles of similarly varying diameter, the combination with a suitable welding device; of an endless chain for conveying the article; paired projections on said chain, one adapted to abut against the larger end of the article, the other to support the smaller end thereof with the seam parallel to the direction of travel; and means for feeding the article past said device, said means including a pair of complementary, peripherally grooved rollers, the grooves in the latter being of circular cross-section, but constantly increasing in diameter from the point where the article is initially gripped to the point where it is discharged.

17. In mechanism for welding longitudinal seams on tubes or like articles of varying diameter, the combination with a suitable welding device; of means for conveying the article with its seam parallel to the direction of travel; other means adapted to receive such article from said conveying means and feed the same past said device, said feeding means including a pair of complementary, peripherally grooved rollers, the grooves in the latter being of varying cross-sectional form to correspond with the varying diameter of the article and having their upper edges disposed in a plane parallel with the seam of such article; and a pre-heating furnace disposed in front of said feed rollers.

18. Feeding mechanism for tubes or like articles of varying diameter, comprising a pair of complementary, peripherally grooved rollers, the grooves in the latter being of varying cross-sectional form to correspond with the varying diameter of the article, and said grooves having corresponding edges disposed in the same plane.

19. Feeding mechanism for tapered tubes or like articles of similarly varying diameter, comprising a pair of complementary, peripherally grooved rollers, the grooves in the latter being of circular cross-section, but constantly increasing in diameter from the point where the article is initially gripped to the point where it is discharged, and said grooves having corresponding edges disposed in the same plane.

20. Feeding mechanism for tubes or like articles of varying diameter, comprising a pair of complementary, peripherally grooved rollers, the grooves in the latter being of varying cross-sectional form to correspond with the varying diameter of the article; and a guide roller alined with the direction of movement of such article through said feed rollers, said guide roller being resiliently mounted to accommodate the varying diameter of the article.

21. Feeding mechanism for tapered tubes or like articles of similarly varying diameter, comprising a pair of complementary, peripherally grooved rollers, the grooves in the latter being of circular cross-section, but constantly increasing in diameter from the point where the article is initially gripped to the point where it is discharged, and said grooves having corresponding edges disposed in the same plane, and a guide roller alined with the direction of movement of such article through the aforesaid roller, said guide roller being resiliently mounted to accommodate the varying diameter of the article.

22. Feeding mechanism for tapered tubes or like articles of similarly varying diameter, comprising a pair of complementary, peripherally grooved rollers, the grooves in the latter being of circular cross-section, but constantly increasing in diameter from the point where the article is initially gripped to the point where it is discharged, and said grooves having corresponding edges disposed in the same plane; and a pair of guide rollers disposed one above the other in line with the direction of movement of such article through the aforesaid rollers, the lower of said guide rollers being resiliently mounted to accommodate the varying diameter of the article.

23. Feeding mechanism for tapered tubes or like articles of similarly varying diameter, comprising a pair of complementary, peripherally grooved rollers, the grooves in the latter being of circular cross-section, but constantly increasing in diameter from the point where the article is initially gripped to the point where it is discharged, and said grooves having corresponding edges disposed in the same plane; a pair of guide rollers disposed one above the other in line with the direction of movement of such article through the aforesaid rollers, the lower of said guide rollers being resiliently mounted to accommodate the varying diameter of the article; and another roller formed to engage the seam in such article and so position the latter angularly about its axis.

Signed by me, this 30 day of Sept. 1916.

FRANK KRITZ.

Attested by—
F. R. WILHELMY,
M. H. WILLIAMS.